United States Patent
Nygren et al.

(10) Patent No.: US 12,198,870 B2
(45) Date of Patent: Jan. 14, 2025

(54) CAPACITOR ASSEMBLY

(71) Applicant: ABB Schweiz AG, Baden (CH)

(72) Inventors: Toni Nygren, Helsinki (FI); Asko Mielonen, Helsinki (FI); Joonas Puukko, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/930,485

(22) Filed: Sep. 8, 2022

(65) Prior Publication Data

US 2023/0084227 A1     Mar. 16, 2023

(30) Foreign Application Priority Data

Sep. 10, 2021   (EP) .................... 21195933

(51) Int. Cl.
| | |
|---|---|
| H01G 9/26 | (2006.01) |
| H01G 2/04 | (2006.01) |
| H01G 2/08 | (2006.01) |
| H01G 2/10 | (2006.01) |
| H01G 9/00 | (2006.01) |

(52) U.S. Cl.
CPC ............ H01G 9/26 (2013.01); H01G 2/04 (2013.01); H01G 2/08 (2013.01); H01G 2/106 (2013.01); H01G 9/0003 (2013.01)

(58) Field of Classification Search
None
See application file for complete search history.

(56) References Cited

U.S. PATENT DOCUMENTS

| 6,021,040 A | 2/2000 | Suzuki et al. |
| 8,570,767 B2 | 10/2013 | Schmit et al. |
| 2004/0136170 A1* | 7/2004 | Tsunezaki ............. H05K 3/301 |
| | | 361/810 |
| 2010/0157532 A1* | 6/2010 | Nguyen ................ H01G 11/10 |
| | | 361/697 |
| 2012/0243142 A1* | 9/2012 | Schmit .................... H01G 4/38 |
| | | 361/271 |
| 2019/0287738 A1* | 9/2019 | Lee ........................ H01G 11/82 |

FOREIGN PATENT DOCUMENTS

| EP | 2104121 A1 | 9/2009 | |
| EP | 2520454 A2 | 11/2012 | |
| EP | 2520454 A3 | 9/2015 | |
| EP | 3550580 A1 | 10/2019 | |
| JP | 03058406 A | 3/1991 | |
| JP | 2009135335 A * | 6/2009 | ............. H01G 11/10 |

OTHER PUBLICATIONS

European Search Report; Application No. EP21195933; Issued: Feb. 23, 2022; 3 Pages.

\* cited by examiner

*Primary Examiner* — Eric W Thomas
(74) *Attorney, Agent, or Firm* — Whitmyer IP Group LLC

(57) ABSTRACT

A capacitor assembly including at least one capacitor each having a first end and a second end spaced apart in a longitudinal direction, and a first terminal and a second terminal located at the first end of the capacitor, the first end being provided with a first surface, and the second end being provided with a second surface; a heat sink having a first cooling surface; and a connection system connecting the at least one capacitor heat conductively to the heat sink such that the second surface of each of the at least one capacitor is in heat conductive connection with the first cooling surface. The connection system is to in contact with the first surface of each of the at least one capacitor.

20 Claims, 3 Drawing Sheets

CAPACITOR ASSEMBLY

TECHNICAL FIELD

The present invention relates to a capacitor assembly comprising at least one capacitor and a heat sink.

BACKGROUND

A known capacitor assembly comprises a capacitor having terminals at a first end thereof, a heat sink, and a connection system connecting the capacitor heat conductively to the heat sink such that a second end of the capacitor is in contact with the heat sink. The first end and the second end of the capacitor are spaced apart in a longitudinal direction. The connection system comprises a threaded pin projecting from the second end of the capacitor, and a nut co-operating with the threaded pin. The threaded pin extends through the heat sink such that the heat sink is pressed between the capacitor and the nut.

In another known capacitor assembly, a side surface of the capacitor is provided with a groove near the second end of the capacitor, and the connection system comprises a plurality of connection protrusions protruding in the groove. The connection protrusions are fixed to the heat sink by screws.

One of the problems associated with the above known capacitor assemblies is that they require specific structures in the capacitor. The first-mentioned known capacitor assembly requires the threaded pin. The latter known capacitor assembly requires the groove which must have the right shape and be in the right location on the side surface in order to be able to co-operate with the connection protrusions.

Another problem associated with the latter known capacitor assembly is that the connection system comprising the plurality of connection protrusions require additional space in a lateral direction, which increases a total space requirement of the capacitor assembly.

SUMMARY

An object of the present invention is to provide a capacitor assembly so as to solve the above problems. The objects of the invention are achieved by a capacitor assembly described in the following.

The invention is based on the idea of providing a capacitor assembly with a connection system which is in contact with a first surface of a capacitor located at a first end thereof. The first surface is an end surface of the capacitor.

An advantage of the capacitor assembly of the invention is that the capacitor assembly does not require any specific structures in the capacitor. Further, space utilization of the capacitor assembly is efficient since the connection system requires little or no space at all in the lateral direction.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
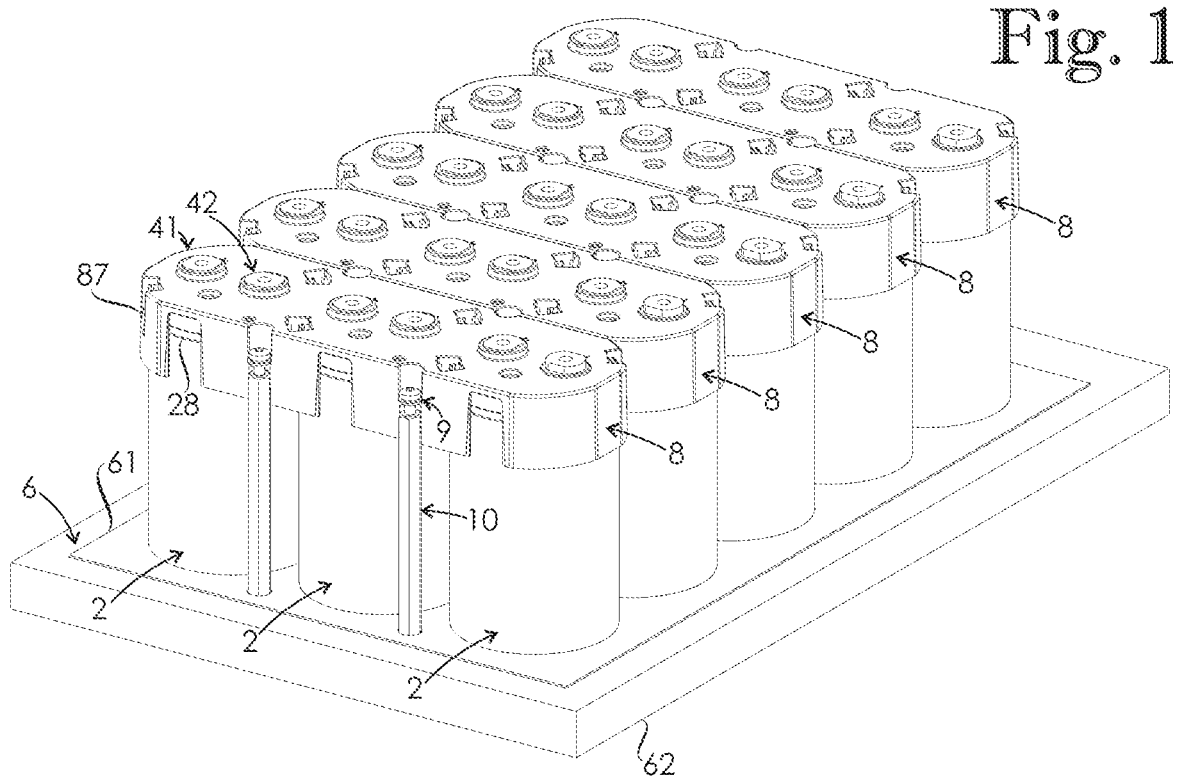
FIG. 1 shows a capacitor assembly according to an embodiment of the invention.
Figure 2:
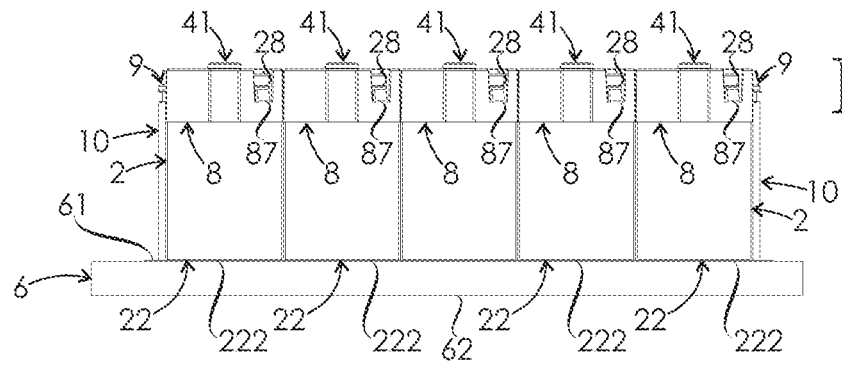
FIG. 2 shows the capacitor assembly of FIG. 1 from a direction perpendicular to a longitudinal direction.
Figure 3:
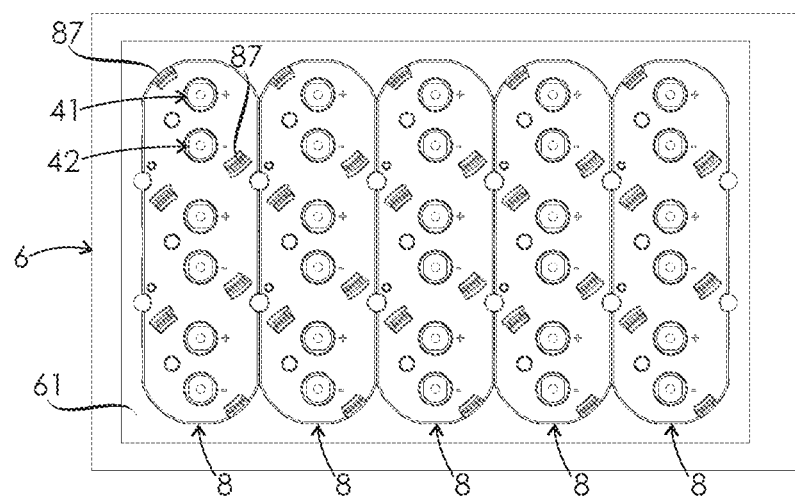
FIG. 3 shows the capacitor assembly of FIG. 1 from a direction parallel with the longitudinal direction.
Figure 4:
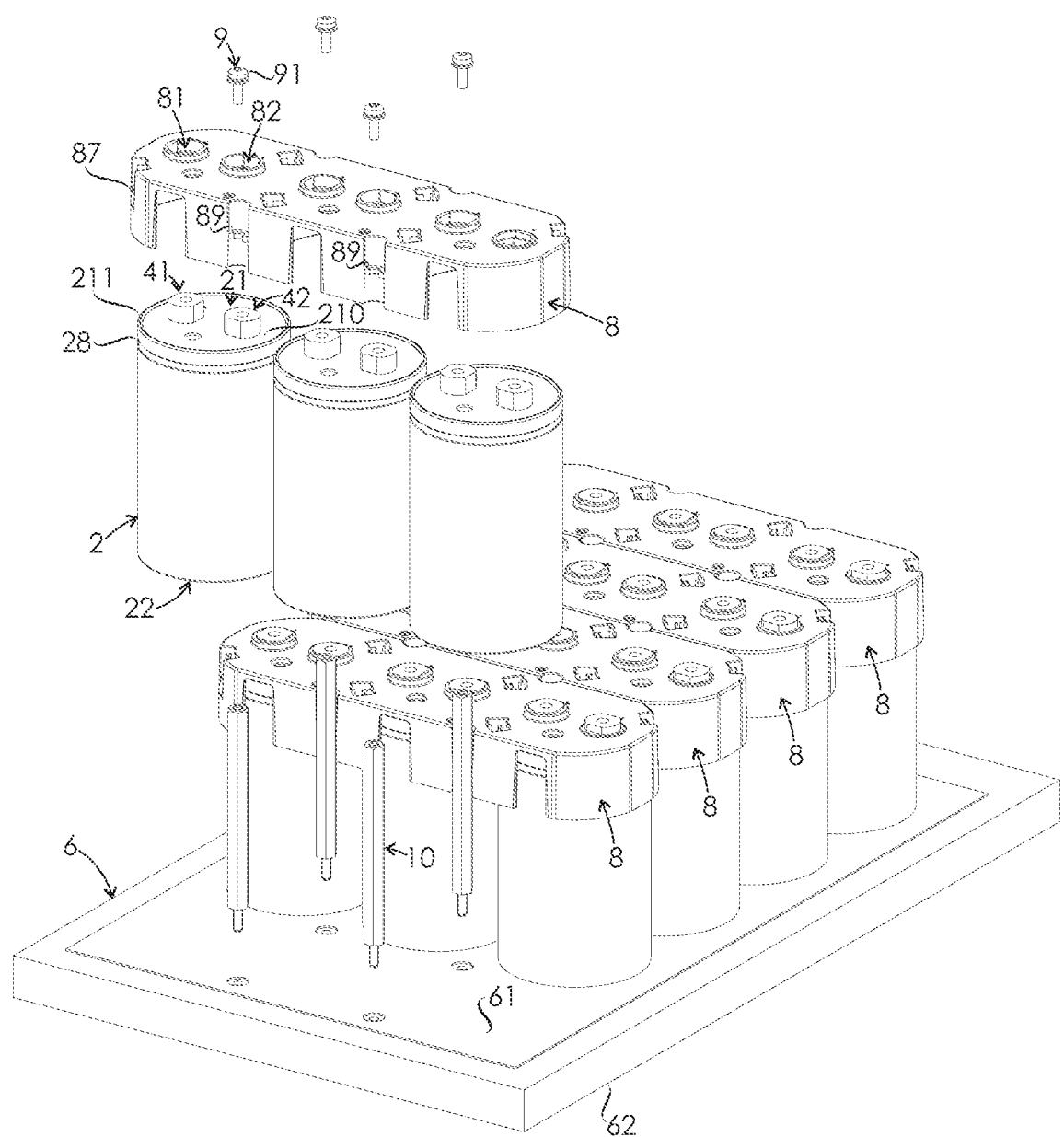
FIG. 4 shows the capacitor assembly of FIG. 1 in a disassembled state.

FIG. 1 shows a capacitor assembly comprising fifteen capacitors 2, a heat sink 6, and a connection system connecting the capacitors 2 heat conductively to the heat sink 6. FIG. 2 is a side view of the capacitor assembly of FIG. 1, and shows the capacitor assembly from a direction perpendicular to a longitudinal direction. FIG. 3 shows the capacitor assembly of FIG. 1 from above, from a direction parallel with the longitudinal direction. FIG. 4 shows the capacitor assembly of FIG. 1 in a disassembled state.

Each of the capacitors 2 is an electrolyte capacitor, and has generally a form of a right circular cylinder. The heat sink 6 has a first cooling surface 61, which is a planar surface.

Each of the capacitors 2 has a first end 21 and a second end 22 spaced apart in the longitudinal direction, and a first terminal 41 and a second terminal 42 located at the first end 21 of the capacitor 2. The longitudinal direction is parallel with a height of the cylindrical shape of the capacitor 2, and perpendicular to the first cooling surface 61. The first terminal 41 and the second terminal 42 are adapted for electrically connecting the capacitor 2 to an electrical circuit (not shown).

The first end 21 of each capacitor 2 is provided with an inner end surface 210 and a first surface 211 such that the first surface 211 forms a brim for the first end 21, and surrounds the inner end surface 210. The first terminal 41 and the second terminal 42 protrude from the inner end surface 210. The second end 22 of each capacitor 2 is provided with a second surface 222. The second surface 222 faces generally an opposite direction than the inner end surface 210 and the first surface 211. The second surface 222 has a normal which is parallel with the longitudinal direction. The second surface 222 of each of the capacitors 2 is in heat conductive contact with the first cooling surface 61.

The heat sink 6 is a liquid cooled element. In an alternative embodiment, the heat sink is an air-cooled element.

In the embodiment shown in FIG. 1, the first cooling surface 61 of the heat sink 6 is formed by a thermal interface material on a body of the heat sink 6. The thermal interface material comprises silicone rubber reinforced with fibre glass. The thermal interface material is an electrically insulating and heat conductive material. The silicone rubber also smooths contact surfaces between the body of the heat sink 6 and the second surfaces 222 of the capacitors 2 thereby increasing heat transfer area between the heat sink 6 and the capacitors 2. In an alternative embodiment, the thermal interface material comprises an electrically conductive material such as graphene. In a further alternative embodiment, there is no separate thermal interface material, and the second surface of each of the capacitors is in heat conductive contact directly with the body of the heat sink.

The body of the heat sink 6 is made of copper. In an alternative embodiment, the body of the heat sink is made of another heat conducting material such as aluminium or heat conducting plastic.

The connection system is in contact with the first surface 211 of each of the capacitors 2. The connection system comprises five support elements 8 and a pressing system. The support elements 8 are identical with each other. The support elements 8 are in contact with the first surface 211 of each of the capacitors 2 such that each of the support elements 8 is in contact with the first surface 211 of three capacitors 2. It could be said that each of the support elements 8 is adapted to receive three capacitors 2.

The support elements 8 direct longitudinal support forces to the capacitors 2. The longitudinal support forces are parallel with the longitudinal direction. The longitudinal support forces ensure that the capacitors 2 are in proper heat conductive connection with the heat sink 6.

Figure 6:
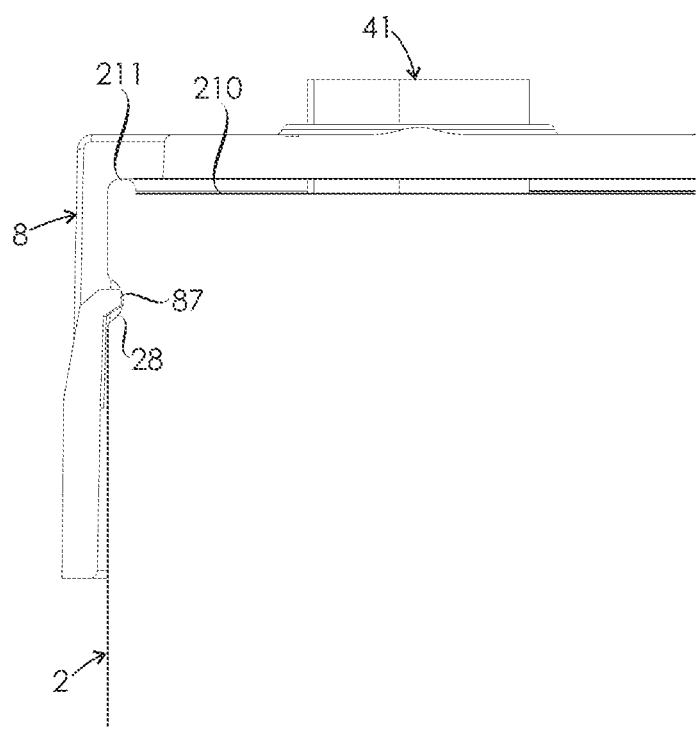
FIG. 6 shows a cross section of a detail of the capacitor assembly of FIG. 1 seen from a direction perpendicular to the longitudinal direction.

The first surface 211 is located farther from the second surface 222 in the longitudinal direction than the inner end surface 210. In FIG. 6 which shows a cross section of a detail of the capacitor assembly of FIG. 1 seen from a direction perpendicular to the longitudinal direction, the first surface 211 is located upper than the inner end surface 210. It could be said that the first surface 211 protrudes from the inner end surface 210. All longitudinal support forces exerted by the connection system to a capacitor 2 are directed to the first surface 211 of the capacitor 2. In an alternative embodiment, at least 75% of longitudinal support forces exerted by the connection system to a capacitor is directed to the first surface of the capacitor. Directing a majority of the longitudinal support forces to the brim of the electrolyte capacitor is advantageous since the brim can withstand more pressing forces than the inner end surface 210.

Each support element 8 is an injection moulded element made of flexible plastic material having high thermal conductivity. In an alternative embodiment, at least one support element is made of another electrically insulating material.

The pressing system presses the support elements 8 against the to first surfaces 211 of the capacitors 2 in order to keep the capacitors 2 in heat conductive connection with the first cooling surface 61. Pressing forces exerted by the pressing system are parallel with the longitudinal direction.

The pressing system comprises twelve screws 9 and twelve column elements 10. Each of the column elements 10 extends between the first cooling surface 61 and one of the support elements 8. Each column element 10 has an internal thread at its first longitudinal end, and an external thread at its second longitudinal end. The internal thread of the column element 10 co-operates with an external thread of a corresponding screw 9. The external thread of the column element 10 co-operates with an internal thread formed in the heat sink 6.

A head 91 of each screw 9 exerts a pressing force to a screw contact area 89 of a corresponding support element 8. Each of the screw contact areas 89 surrounds corresponding screw 9 in a 180° angle. Two screw contact areas 89 are shown in FIG. 4.

In an alternative embodiment, a second longitudinal end of each column element comprises a flange which is in contact with a second cooling surface 62 of the heat sink 6 facing an opposite direction than the first cooling surface 61. Each column element extend through the heat sink via a corresponding column aperture.

In a further alternative embodiment, the column elements are integral parts of the heat sink. In yet another alternative embodiment, internal threads are formed in the heat sink, and the screws of the pressing system are so long, that they co-operate with the internal threads of the heat sink without need for column elements. In yet another embodiment, screw contact areas are provided in contact extensions of support elements, wherein the contact extensions extend in the longitudinal direction close to the first cooling surface thereby making the column elements unnecessary.

Each support element 8 comprises a positioning system for ensuring that the three capacitors 2 are correctly positioned relative to the support element 8. The correct positioning of the capacitors 2 allows the first terminals 41 and the second terminal 42 of the capacitors 2 to be connected to corresponding bus bars (not shown) without rotating each capacitor 2 around its centre axis which extends parallel with the longitudinal direction.

The positioning system comprises for each of the capacitors 2 a first terminal opening 81 in which the first terminal 41 is received, and a second terminal opening 82 in which the second terminal 42 is received. The first terminal opening 81 and the second terminal opening 82 are openings through which the first terminal 41 and the second terminal 42 extend, respectively. Edges of the first terminal opening 81 are adapted to exert lateral support forces to the first terminal 41, and edges of the second terminal opening 82 are adapted to exert lateral support forces to the second terminal 42.

Shape and size of the first terminal opening 81 are selected such that edges of the first terminal opening 81 are adapted to support the first terminal 41 from all lateral directions perpendicular to the longitudinal direction such that the first terminal opening 81 prevents substantially all movement of the first terminal 41 in the lateral directions. Shape and size of the second terminal opening 82 are selected such that edges of the second terminal opening 82 are adapted to support the second terminal 42 from all lateral directions perpendicular to the longitudinal direction such that the second terminal opening 82 prevents substantially all movement of the second terminal 42 in the lateral directions. In some embodiments, preventing substantially all movement of a terminal allows movement smaller than or equal to 5 mm in at least one lateral direction, said tolerance being selected such that the small movement does not allow the capacitor to reach a position that hinders connecting the capacitor to a corresponding bus bar.

It should be noted that suitable shapes and sizes of the first terminal opening and the second terminal opening depend on the shapes and sizes of the of the first terminal and the second terminal. Further, in some embodiments the first terminal opening and the second terminal opening are not separate openings but are part of a common terminal opening. For example, it is clear that the first terminal opening 81 and the second terminal opening 82 could be connected with a connecting slot without affecting the functions of the first terminal opening and the second terminal opening.

In the capacitor assembly of FIG. 1, both the first terminal 41 and the second terminal 42 has a non-circular cross section. The cross sections of the first terminal 41 and the second terminal 42 each has generally a shape of a circle from which two segments have been cut off. The cross section of each terminal is symmetric. The cross sections of the first terminal 41 and the second terminal 42 have identical shapes but they are rotated 90° relative to each other, thereby ensuring that a capacitor 2 can be received in a support element 8 only in the correct position.

Each of the capacitors 2 comprises a retaining member 28 on its side surface located between the first surface 211 and the second surface 222 in the longitudinal direction. The side surface of the capacitor 2 faces in a direction perpendicular to the longitudinal direction. The retaining member 28 is a circumferential groove extending round the capacitor 2. A cross sectional shape of the circumferential groove is best seen in FIG. 6.

Each support element 8 comprises a retaining system cooperating with the retaining members 28 of the three capacitors 2 the support elements 8 is in contact with. The retaining system exerts retaining forces to the capacitors 2, preventing separation of the capacitors 2 from the support element 8. The co-operation of the retaining systems and the retaining members 28 of the capacitors enable manufacturing sub-assemblies each comprising a support element 8 and corresponding capacitors 2. The sub-assemblies are easy to move since the capacitors 2 do not fall off from the sub-assembly during the moving.

Figure 5:
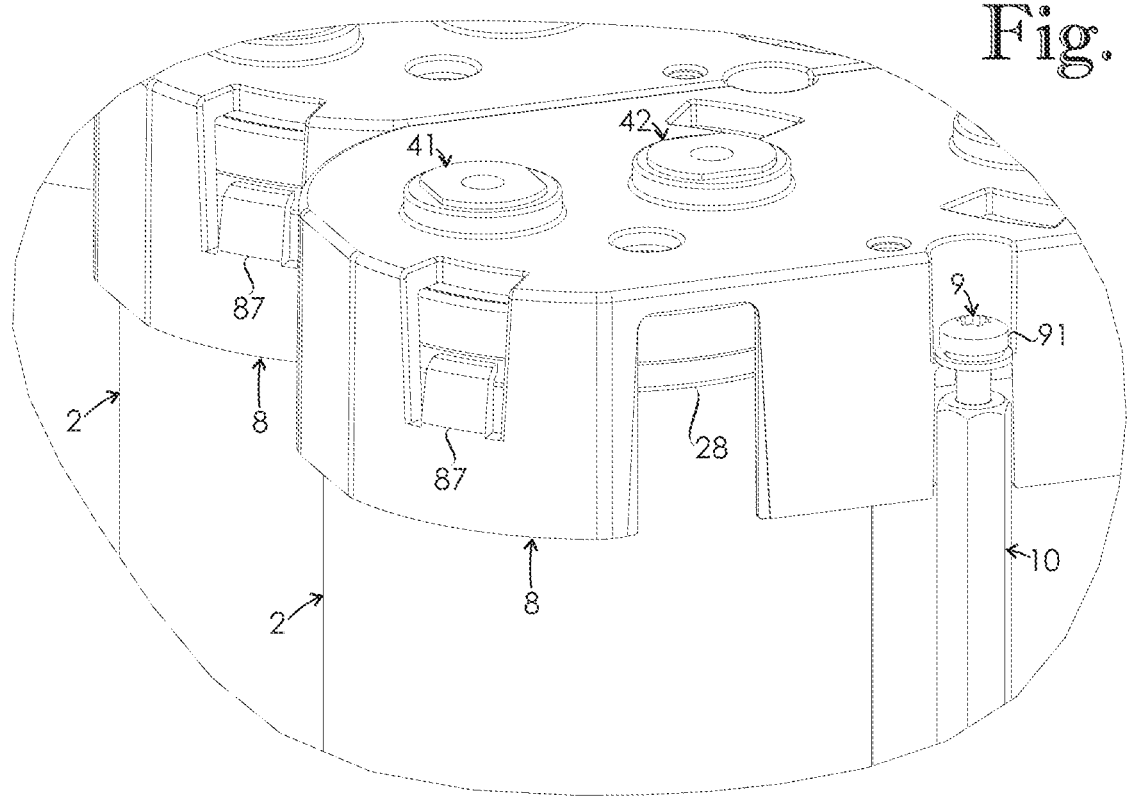
FIG. 5 shows a detail of the capacitor assembly of FIG. 1, the detail comprising a retaining protrusion.

The retaining system is a snap fit system integrated to the support element 8. The retaining system comprises two retaining protrusions 87 for each capacitor 2. A free end of each retaining protrusion 87 is received in the retaining member 28 of corresponding capacitor 2, and is adapted to exert the s retaining forces to the capacitor 2. The retaining forces are parallel with the longitudinal direction. A shape of the retaining protrusion 87 is best seen in FIG. 5 showing a detail of the capacitor assembly of FIG. 1, and in FIG. 6 which also depicts cooperation between the retaining protrusion 87 and the retaining member 28.

Herein, a snap fit system is a system based on flexibility of components of the system. The retaining system of the snap fit type does not comprise any separate springs.

The capacitors 2 of the capacitor assembly are identical with each other, and each of the capacitors 2 has a capacitor diameter perpendicular to the longitudinal direction. The side surfaces of adjacent capacitors 2 received in a support element 8 are in contact with each other, thereby making space utilization efficient. In an alternative embodiment, a support element is in contact with the first surface of each of a plurality of capacitors, wherein a distance between adjacent capacitors in contact with the support element is less than or equal to 7% of the capacitor diameter.

In the capacitor assembly of FIG. 1, each of the support elements 8 is in contact with the first surfaces 211 of three capacitors 2, and the five support elements 8 are placed in an array such that the capacitors 2 form a three by five matrix. A distance between adjacent capacitors 2 received in adjacent support elements 8 is small. In an alternative embodiment, a capacitor assembly comprises a plurality of support elements each of which is in contact with the first surfaces of several capacitors, wherein the plurality of support elements is placed in an array such that a distance between adjacent capacitors in contact with adjacent support elements is less than or equal to 10% of the capacitor diameter.

FIG. 3 shows that the adjacent support elements 8 of the array are in contact with each other. That is possible since each of the screw 9 located between adjacent support elements 8 is located in a gap formed between four adjacent capacitors 2, wherein the screw 9 presses the two adjacent support elements 8 against the first surfaces 211 of corresponding capacitors 2. Herein, four adjacent capacitors refer to four capacitors whose s centre axis are located in corners of a square. One screw 9 is able to press two different support elements 8 due to the specific shape of the screw contact areas 89 discussed above.

It will be obvious to a person skilled in the art that the inventive concept can be implemented in various ways. The invention and its embodiments are not limited to the examples described above but may vary within the scope of the claims.

The invention claimed is:

1. A capacitor assembly comprising:
   at least one capacitor each having a first end and a second end spaced apart in a longitudinal direction, and a first terminal and a second terminal located at the first end of the capacitor, the first end being provided with a first surface, and the second end being provided with a second surface;
   a heat sink having a first cooling surface; and
   a connection system connecting the at least one capacitor heat conductively to the heat sink such that the second surface of each of the at least one capacitor is in heat conductive connection with the first cooling surface,
   wherein the connection system is in contact with the first surface of each of the at least one capacitor,
   wherein the connection system comprises at least one support element in contact with the first surface of each of the at least one capacitor, and a pressing system for pressing the at least one support element against the first surface of each of the at least one capacitor in order to keep the at least one capacitor in heat conductive connection with the first cooling surface,
   wherein the at least one support element comprises a positioning system for ensuring that the at least one capacitor is correctly positioned relative to the at least one support element, and
   wherein the positioning system comprises for each of the at least one capacitor a first terminal opening in which the first terminal is received, and a second terminal opening in which the second terminal is received.

2. The capacitor assembly according to claim 1, wherein the pressing system comprises at least one screw.

3. The capacitor assembly according to claim 2, wherein the pressing system comprises at least one column element extending between the first cooling surface and the at least one support element, the at least one column element having at least one internal thread co-operating with at least one external thread of the at least one screw.

4. The capacitor assembly according to claim 1, wherein each of the at least one capacitor comprises a retaining member on its side surface located between the first surface and the second surface in the longitudinal direction, and the at least one support element comprises a retaining system co-operating with the retaining member of each of the at least one capacitor for exerting retaining forces to the at least one capacitor, the retaining forces preventing separation of the at least one capacitor from the at least one support element.

5. The capacitor assembly according to claim 4, wherein the retaining system is a snap fit system integrated to the at least one support element.

6. The capacitor assembly according to claim 1, wherein each of the at least one capacitor has a cylindrical shape such that the longitudinal direction is parallel to a height of the cylindrical shape.

7. The capacitor assembly according to claim 6, wherein the first end of the at least one capacitor comprises an inner end surface surrounded by the first surface which forms a brim for the first end, and the first surface is located farther from the second surface in the longitudinal direction than the inner end surface, and at least 75% of longitudinal support forces exerted by the connection system to the at least one capacitor are directed to the brim of the at least one capacitor.

8. The capacitor assembly according to claim 6, wherein each of the at least one capacitor is an electrolyte capacitor.

9. The capacitor assembly according to claim 1, wherein the at least one support element is an injection moulded element.

10. A capacitor assembly comprising:
at least one capacitor each having a first end and a second end spaced apart in a longitudinal direction, and a first terminal and a second terminal located at the first end of the capacitor, the first end being provided with a first surface, and the second end being provided with a second surface;
a heat sink having a first cooling surface; and
a connection system connecting the at least one capacitor heat conductively to the heat sink such that the second surface of each of the at least one capacitor is in heat conductive connection with the first cooling surface,
wherein the connection system is in contact with the first surface of each of the at least one capacitor,
wherein the connection system comprises at least one support element in contact with the first surface of each of the at least one capacitor, and a pressing system for pressing the at least one support element against the first surface of each of the at least one capacitor in order to keep the at least one capacitor in heat conductive connection with the first cooling surface,
wherein each of the at least one capacitor has a cylindrical shape such that the longitudinal direction is parallel to a height of the cylindrical shape,
wherein the capacitor assembly comprises a plurality of capacitors which are identical with each other and each have a capacitor diameter, and the support element in contact with the first surface of each of the plurality of capacitors, wherein a distance between adjacent capacitors in contact with the support element is less than or equal to 7% of the capacitor diameter,
wherein the capacitor assembly comprises a plurality of support elements each of which is in contact with the first several capacitors, wherein the plurality of support elements is placed in an array such that a distance between adjacent capacitors in contact with adjacent support elements is less than or equal to 10% of the capacitor diameter; and
wherein the pressing system comprises a screw between two adjacent support elements, the screw being located in a gap formed between four adjacent capacitors, wherein the screw presses the two adjacent support elements against the first surfaces of corresponding capacitors.

11. The capacitor assembly according to claim 10, wherein the at least one support element is an injection moulded element.

12. The capacitor assembly according to claim 10, wherein the pressing system comprises at least one column element extending between the first cooling surface and the at least one support element, the at least one column element having at least one internal thread co-operating with at least one external thread of the at least one screw.

13. The capacitor assembly according to claim 10, wherein each capacitor comprises a retaining member on its side surface located between the first surface and the second surface in the longitudinal direction, and the at least one support element comprises a retaining system co-operating with the retaining member of each capacitor for exerting retaining forces to each capacitor, the retaining forces preventing separation of each capacitor from the at least one support element.

14. The capacitor assembly according to claim 13, wherein the retaining system is a snap fit system integrated to the at least one support element.

15. The capacitor assembly according to claim 10, wherein each of the at least one capacitor is an electrolyte capacitor.

16. A capacitor assembly comprising:
at least one capacitor each having a first end and a second end spaced apart in a longitudinal direction, and a first terminal and a second terminal located at the first end of the capacitor, the first end being provided with a first surface, and the second end being provided with a second surface;
a heat sink having a first cooling surface; and
a connection system connecting the at least one capacitor heat conductively to the heat sink such that the second surface of each of the at least one capacitor is in heat conductive connection with the first cooling surface,
wherein the connection system is in contact with the first surface of each of the at least one capacitor,
wherein the connection system comprises at least one support element in contact with the first surface of each of the at least one capacitor, and a pressing system for pressing the at least one support element against the first surface of each of the at least one capacitor in order to keep the at least one capacitor in heat conductive connection with the first cooling surface,
wherein both the first terminal and the second terminal has a non-circular cross section, and the at least one support element comprises a positioning system for ensuring that the at least one capacitor is correctly positioned relative to the at least one support element, and
wherein the positioning system comprises for each of the at least one capacitor a first terminal opening in which the first terminal is received, and a second terminal opening in which the second terminal is received.

17. The capacitor assembly according to claim 16, wherein the pressing system comprises at least one screw.

18. The capacitor assembly according to claim 17, wherein the pressing system comprises at least one column element extending between the first cooling surface and the at least one support element, the at least one column element having at least one internal thread co-operating with at least one external thread of the at least one screw.

19. The capacitor assembly according to claim 16, wherein each of the at least one capacitor comprises a retaining member on its side surface located between the first surface and the second surface in the longitudinal direction, and the at least one support element comprises a retaining system co-operating with the retaining member of each of the at least one capacitor for exerting retaining forces to the at least one capacitor, the retaining forces preventing separation of the at least one capacitor from the at least one support element.

20. The capacitor assembly according to claim 19, wherein the retaining system is a snap fit system integrated to the at least one support element.

* * * * *